United States Patent
Miyazaki et al.

(10) Patent No.: US 6,317,253 B1
(45) Date of Patent: Nov. 13, 2001

(54) 1.06 μM BAND OPTICAL AMPLIFIER APPARATUS UTILIZING INDUCED EMISSION IN OPTICAL FIBER BY EXCITED RARE-EARTH ELEMENT

(75) Inventors: Tetsuya Miyazaki; Yoshio Karasawa, both of Nara; Minoru Yoshida, Osaka; Toshikazu Gozen, Nishinomiya, all of (JP)

(73) Assignees: ATR Optical & Radio Comm. Research, Kyoto; Mitsubishi Cables Industries, Ltd., Hyogo, both of (JP)

( * ) Notice: Subject to any disclaimer, the term of this patent is extended or adjusted under 35 U.S.C. 154(b) by 0 days.

(21) Appl. No.: 08/871,064

(22) Filed: Jul. 9, 1997

Related U.S. Application Data

(63) Continuation of application No. 08/520,873, filed on Aug. 30, 1995, now abandoned.

(30) Foreign Application Priority Data

Aug. 31, 1994 (JP) .................................................. 6-206492
Jul. 20, 1995 (JP) .................................................. 7-183925

(51) Int. Cl.$^7$ ...................................................... H01S 3/00
(52) U.S. Cl. ............................................................ 359/341
(58) Field of Search ................................ 359/341; 372/6

(56) References Cited

U.S. PATENT DOCUMENTS

| | | | |
|---|---|---|---|
| 4,674,830 | * 6/1987 | Shaw et al. | 350/96.15 |
| 4,723,824 | * 2/1988 | Shaw et al. | 350/96.15 |
| 4,859,016 | * 8/1989 | Shaw et al. | 350/96.15 |
| 4,938,556 | * 7/1990 | Digonnet et al. | 350/96.15 |
| 5,210,808 | 5/1993 | Grasso et al. | |
| 5,319,652 | 6/1994 | Moeller . | |

FOREIGN PATENT DOCUMENTS

| | | |
|---|---|---|
| 1-94329 | 4/1989 | (JP) . |
| 1-94329 | * 5/1989 | (JP) . |

OTHER PUBLICATIONS

Miyazaki et al., *Electronic Letters,* vol. 30(25) Dec. 8, 1994 pp. 2142–2143.

Digonnet et al. (IEEE Journal of Quantum Elect.) (1990) No. 6, pp. 1105–1110.

Marcerou et al. (Journal of Luminescence) (1990) No. 1, pp. 108–110.

Petrov et al. (Soviet Tech. Phys. Letters) 1991 No. 2, pp. 123–124.

Stone et al. (Applied Optics) 1974 vol. 13(6), pp. 1256–1258.

(List continued on next page.)

Primary Examiner—Mark Hellner

(57) ABSTRACT

In an optical amplifier apparatus for amplifying an incident signal light having wavelengths of 1.06 μm band, a first optical isolator makes an incident signal light pass therethrough in one direction from an input end to an output end. An optical fiber includes a core mainly composed of silica glass and doped with a predetermined rare-earth element and the other elements, and a cladding of silica glass, and transfers in a single mode the signal light output from the first optical isolator. An optical multiplexer multiplexes an excitation light having an excitation wavelength of 0.8 μm band with the signal light transferred by the optical fiber, by outputting the excitation light to the optical fiber, and further transfers and outputs the signal light having wavelengths of 1.06 μm band amplified by induced emission in the optical fiber due to the rare-earth element excited by the excitation light. Further, a second optical isolator makes the signal light outputted from the optical multiplexer pass therethrough in one direction from an input end thereof to an output end thereof, and outputs the signal light as an amplified signal light.

21 Claims, 11 Drawing Sheets

OTHER PUBLICATIONS

Mitsuo Yamaga et al., Theoretical Analysis of . . . , The Transactions of The IECE of Japan, vol. E 69, No. 9, pp. 956–967, 09/86.

Henry Plaessmann et al. Multipass Diode Pumped . . . , Optics Letters, Optical Soc. of America, vol. 18, No. 17, pp. 1420–1422, 09/93.

Mitsuhiro Wada et al., Amplification Characteristics . . . , The Institute of Electronics, Information and Communication Engineers, Japan, Spring Conference, SB–9–1, pp. 4-423–424, Mar. 1992.

* cited by examiner

1.06 μM BAND OPTICAL AMPLIFIER APPARATUS UTILIZING INDUCED EMISSION IN OPTICAL FIBER BY EXCITED RARE-EARTH ELEMENT

This application is a continuation of application Ser. No. 08/520,873 filed on Aug. 30, 1995, now abandoned.

BACKGROUND OF THE INVENTION

1. Field of the Invention

The present invention relates to an optical amplifier apparatus for amplifying a signal light having wavelengths of 1.06 μm band, and in particular, to a 1.06 μm band optical amplifier apparatus utilizing an induced emission in an optical fiber by an excited rare-earth element.

2. Description of the Related Art

Conventionally, direct amplification of a signal light of 1.06 μm band wavelengths has been implemented by using either a solid-state laser type optical amplifier (hereinafter, referred to as a first prior art example; See, for example, H. Plaessmann et al., "Multipass diode-pumped solid-state optical amplifier", Optics Letters, Vol. 18, pp. 1420–1422, 1993) or a dielectric optical waveguide type optical amplifier using quartz (hereinafter, referred to as a second prior art example; See, for example, Mitsuhiro Wada et al., "Amplification characteristic of Nd-doped integrated type optical amplifier devices by LD excitation", 1992 Spring Conference of The Institute of Electronics, Information and Communication Engineers, SB-9-1, pp. 423–424, 1992).

However, in order to obtain enough large gain with the constitution of these first and second prior art examples, it has been necessary to prolong the optical path length over which signal light and excitation light overlap each other within the crystal of an amplification medium. Since the density of the amplification medium is limited by the saturation density, it has been necessary to prolong the crystal of the amplification medium or to make the signal light reciprocate over the crystal of the amplification medium many times. As a result, the system would be increased in size as one problem. Moreover, as a further problem, it would be very hard for the second prior art example to obtain high gain more than 10 dB while the first prior art example would be more affected by shifts of the optical axis due to environmental variations. Furthermore, the gain in these prior art examples is dependent largely on polarized waves of the signal light, such that the gain would change with variations in polarized waves of the signal light as a further problem.

Further, for downsizing of the apparatus, an optical amplifier apparatus using an optical fiber doped with rear-earth elements (hereinafter, referred to as a third prior art example) has been disclosed in Japanese Patent Laid-Open Publication No. 1-94329. This apparatus of the third prior art example, however, could not able to amplify a signal light having wavelengths of 1.06 μm band.

SUMMARY OF THE INVENTION

An essential object of the present invention is therefore to provide an optical amplifier apparatus capable of amplifying a signal light having wavelengths of 1.06 μm band without causing the gain to change due to variations in polarized waves of the signal light.

Another object of the present invention is to provide an optical amplifier apparatus smaller in size and lighter in weight as compared with those of the prior art examples.

In order to achieve the above-mentioned objective, according to one aspect of the present invention, there is provided an optical amplifier apparatus comprising:

a first optical isolator for making an incident signal light having wavelengths within the 1.06 μm band pass therethrough in one direction from an input end thereof to an output end thereof, and outputting the signal light;

an optical fiber including a core mainly composed of silica glass and doped with a predetermined rare-earth element and the other elements, and a cladding of silica glass, the optical fiber transferring in a single mode the signal light outputted from the first optical isolator means;

an excitation light source generating excitation light having an excitation wavelength of 0.8 μm band;

an optical multiplexer for multiplexing the excitation light generated by the excitation light source with the signal light transferred by the optical fiber, by outputting the excitation light generated by the excitation light source to the optical fiber, and for transferring and outputting the signal light having wavelength of 1.06 μm band amplified by induced emission in the optical fiber due to the rare-earth element excited by the excitation light; and a second optical isolator means for making the signal light output from the optical multiplexer pass therethrough in one direction from an input end thereof to an output end thereof, and outputting the signal light as an amplified signal light.

In the above-mentioned optical amplifier apparatus, the excitation wavelength is preferably set within a range from 0.800 μm to 0.815 μm.

In the above-mentioned optical amplifier apparatus, the rare-earth element is preferably Nd, and one of said other elements Al, and wherein an addition density of Al is set within a range from 500 ppm to 15,000 ppm.

In the above-mentioned optical amplifier apparatus, another one of the other elements is preferably Ge, and wherein an addition density of $GeO_2$ with which said core is doped is set within a range from 5 weight % to 35 weight %.

In the above-mentioned optical amplifier apparatus, a product of a doping amount of Nd into the optical fiber and a length of the optical fiber is preferably set within a range from 2 km-ppm to 15 km-ppm.

In the above-mentioned optical amplifier apparatus, a difference between refractive indexes of the core and the cladding of the optical fiber is preferably set within a range from 0.8% to 2%.

In the optical amplifier apparatus with the above-mentioned arrangement, the first isolator makes an incident signal light having wavelengths of 1.06 μm band pass therethrough in one direction from the input end thereof to the output end thereof. Subsequently, the silica glass optical fiber transfers in a single mode a signal light output from the first optical isolator. Then, the optical multiplexer outputs the excitation light to the optical fiber, thereby combining the excitation light with the incident signal light, and transfers and outputs the signal light having wavelengths of 1.06 μm band amplified by induced emission in the optical fiber caused by rear-earth elements excited by the excitation light. Further, the second optical isolator makes the signal light outputted from the optical multiplexer means pass therethrough in one direction from the input end thereof to the output end thereof, and then outputs an amplified output signal light.

According to the present invention, a signal light having wavelengths of 1.06 μm band can be amplified without causing the gain to change due to any polarization variation of the signal light. Further, the optical amplifier apparatus of the present invention is advantageously small in size and light in weight as compared with the prior art examples.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Preferred embodiments according to the present invention are now described with reference to the accompanying drawings.

Figure 1:
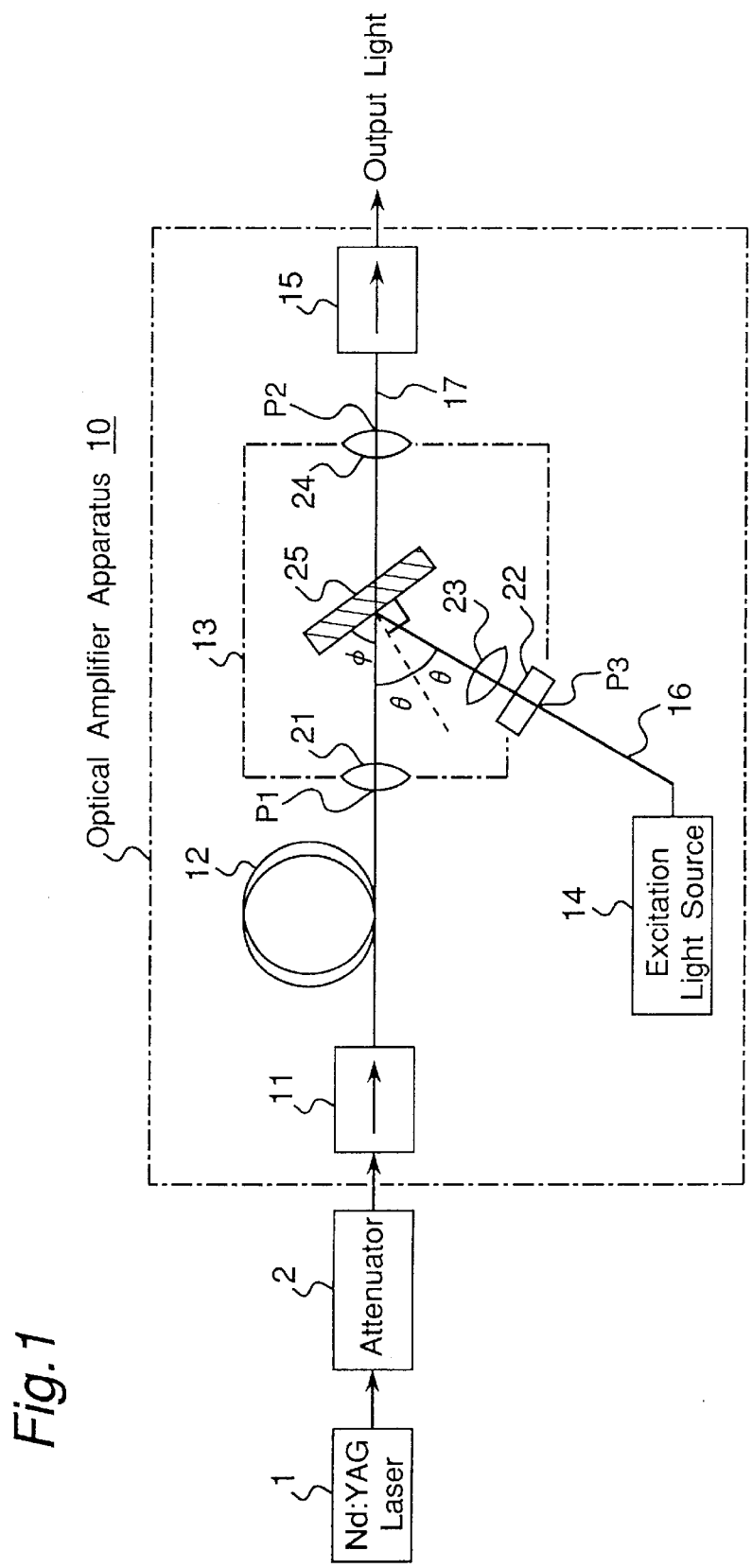
FIG. 1 is a block diagram of an optical amplifier apparatus of a preferred embodiment according to the present invention.

FIG. 1 is a block diagram of an optical amplifier apparatus 10 of a rear excitation system of a preferred embodiment according to the present invention.

As shown in FIG. 1, the optical amplifier apparatus 10 of the present preferred embodiment comprises an optical isolator 11, an optical fiber or optical fiber cable 12, an optical multiplexer module 13, an excitation light source 14, and an optical isolator 15.

Figure 5:
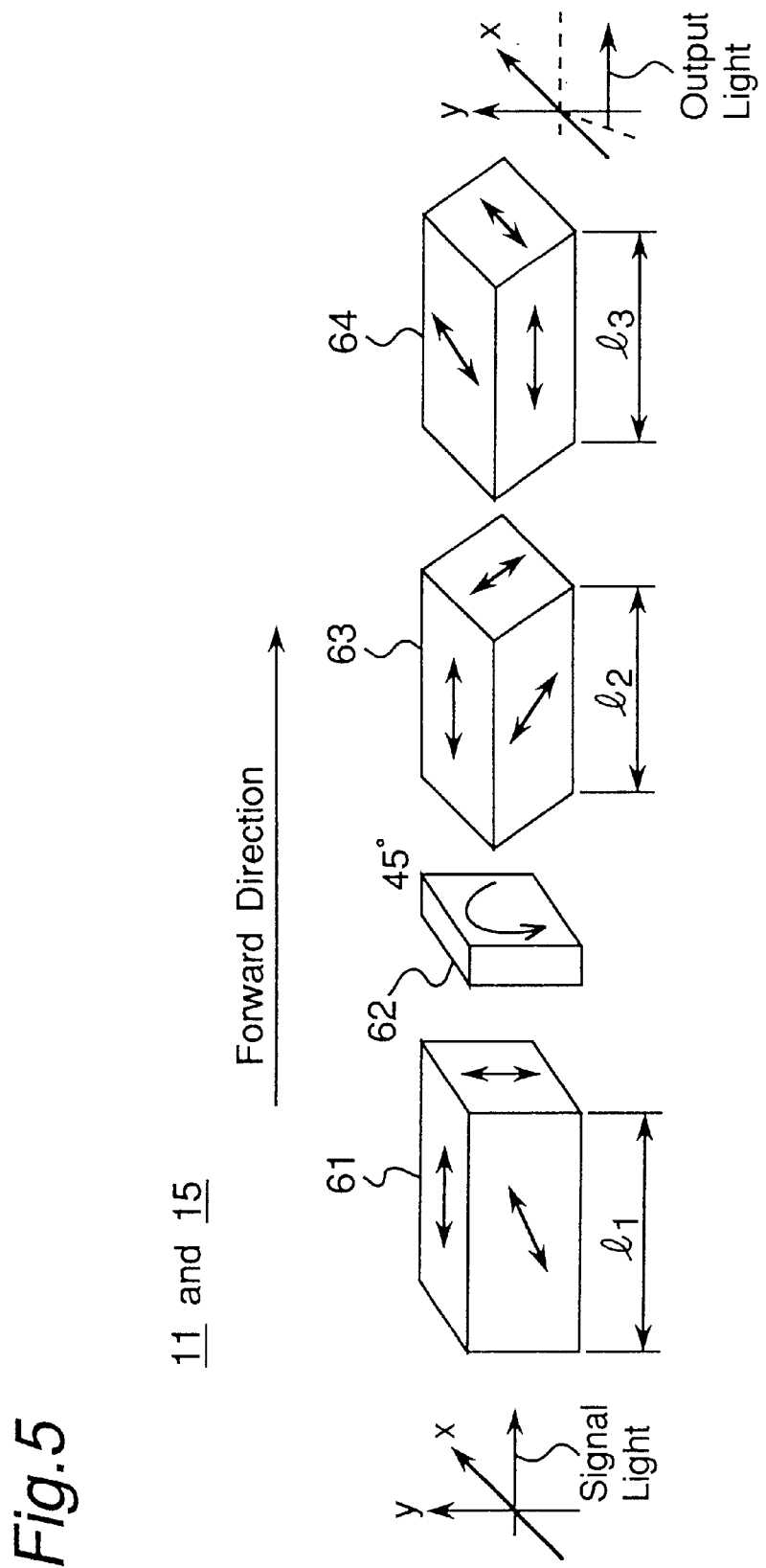
FIG. 5 is a block diagram of the optical isolator of FIG. 1.

Referring to FIG. 1, an Nd:YAG laser 1 generates a signal light of a single mode having wavelengths of 1.06 μm band, and outputs the signal light to the optical isolator 11 of the optical amplifier apparatus 10 via an attenuator 2. In this case, the 1.06 μm band is defined as wavelengths within a range from 1.05 μm to 1.10 μm. The optical isolators 11 and 15 are wavelength-selective optical isolators. As shown in FIG. 5, each of the optical isolators 11 and 15 comprises a calcite crystal 61, a Faraday rotator 62, a calcite crystal 63, and a calcite crystal 64, and is constituted in a manner known to those skilled in the art. Each of the optical isolators 11 and 15 transfers and outputs a signal light incident on the input end thereof in one direction from input end thereof to output end thereof. It is noted that arrows in the calcite crystal 61, 63 and 64 represent the C-axis of the crystal, while the arrow in the Faraday rotator 62 represents a direction in which the plane of polarization rotates. Each of the calcites crystals 61, 63 and 64 separates an incident signal light into a polarized wave component parallel to the C-axis of the crystal and a polarized wave component vertical to the C-axis of the crystal, and then, outputs the parallel polarized wave component with its optical axis shifted from the z-axis. In addition, longitudinal lengths $l_1$, $l_2$ and $l_3$ of the calcite crystals 61, 63 and 64 are set, respectively, so as to have a relationship expressed by the following Equation (1):

$$l_1 = \sqrt{2} \cdot l_2 = \sqrt{2} \cdot l_3 \qquad (1)$$

When the incident signal light is transferred in the z-axis direction vertical to the x- and y-axes as shown in FIG. 5 so as to be incident onto the input end surface of the calcite crystal 61, the signal light comes incident on the Faraday rotator 62 via the calcite crystal 61, where the Faraday rotator 62 allows the polarized wave of the signal light to pass therethrough with a 45° clockwise rotation, as viewed along the direction of transfer of the signal light about the input z-axis, thus outputting the signal light onto the input end surface of the calcite crystal 63. Then, the signal light is output via the calcite crystals 63 and 64. The signal light output from the calcite crystal 64 is delivered from a predetermined position of the third quadrant on the x-y plane, when the output end surface of the calcite crystal 64 is viewed from the output side. Therefore, the signal light incident on the input end surface of the calcite crystal 61 is all output from the output end surface of the calcite crystal 64, independently of its state of polarization. On the other hand, a reflected light incident to the output end surface of the calcite crystal 64 after being output from the output end surface of the calcite crystal 64 is not output toward the input end surface of the calcite crystal 61. In addition, in the optical isolators 11 and 15, gain variations of the incident signal light due to polarization variations are below 0.2 dB, so that the polarization dependency of the signal light is substantially null.

The optical isolator 11 transfers the signal light incident thereon from the attenuator 2 in one direction from the input end thereof to the output end thereof, and then outputs the signal light to the optical fiber 12. The optical fiber 12 has one end optically connected to the output end of the optical isolator 11, and another end optically connected to a coupling focus lens 21 provided at a port P1 of the optical multiplexer module 13.

Figure 2:
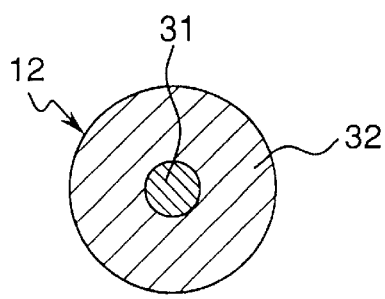
FIG. 2 is a sectional view showing a cross section of the optical fiber of FIG. 1.

The optical fiber 12 is an optical cable for transferring a signal light of a single mode, and, as shown in FIG. 2, comprises a core 31 having a circular cross section, and a cladding 32 having an annular cross section and surrounding the core 31. The core 31 and the cladding 32 are made of, for example, two types of silica glass having different refractive indexes. The optical fiber 12 is fabricated by, for example, the VAD method (vapor phase axial deposition method) which has been known to those skilled in the art, and has its core 31 portion, which is composed mainly of silica glass ($SiO_2$), doped with Nd (neodymium) as a predetermined rare-earth element as well as doped with Al (aluminum) as one of the other elements, then $Al_2O_3$ is actually added to the core 31. The core 31 is further doped preferably with Ge (germanium) as another of the other elements, then $GeO_2$ is actually added to the core 31. The diameter of the core 31 is preferably approximately 5 μm, and the cut-off wavelength of the optical fiber 12 is preferably 0.75 μm.

The excitation light source 14 generates an excitation light of a single mode having a predetermined excitation wavelength of 0.8 μm band, and outputs the excitation light toward a multi-layered dielectric plate 25 via an optical fiber 16, and a collimator lens 22 and a coupling focus lens 23 which are provided at a port P3 of the optical multiplexer module 13. In this case, the 0.8 μm band is defined as wavelengths within a range from 0.800 μm to 0.816 μm. As is apparent from FIG. 11, the above-mentioned excitation wavelength is preferably set within a range from 0.800 μm to 0.815 μm.

The optical multiplexer module 13 comprises a multi-layered dielectric plate 25 which reflects the excitation light having an excitation wavelength λp, but transmits the signal light having a signal wavelength λs.

Figure 4:
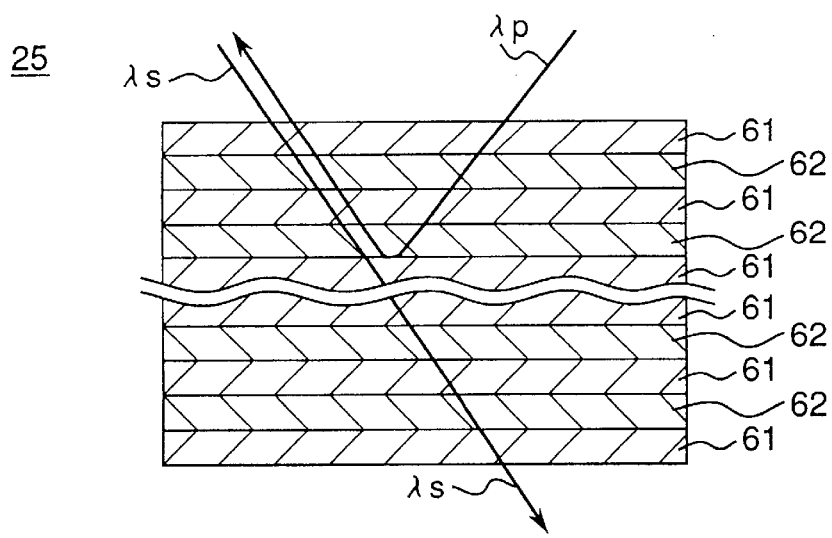
FIG. 4 is a sectional view of a multi-layered dielectric plate used in the optical multiplexer module of FIG. 1.

As shown in FIG. 4, the multi-layered dielectric plate 25 is constructed by alternately stacking a dielectric thin film 61 having a relatively high refractive index and a dielectric thin film 62 having a relatively low refractive index, for example, to a total of 20 to 50 layers. Such multi-layered formation of the dielectric plate is intended to set a larger difference between the reflection coefficient and the transmittance coefficient due to differences in wavelength. In the optical multiplexer module 13, the port P1 and the port P2 are located opposite to each other with the multi-layered dielectric plate 25 whose incident surface is tilted by φ with respect to the optical axis in the direction from the port P1 to the port P2, while the port P3 is located at such a position that the excitation light derived from the port P3 is incident onto the multi-layered dielectric plate 25 at an angle of incidence θ=90°−φ, is reflected by the multi-layered dielectric plate 25 at an angle of reflection θ identical to the angle of incidence, and reaches the port P1.

In this case, the coupling focus lens 21 for connection with the optical fiber 12 is provided at the port P1, while the coupling focus lens 24 for connection with the input end surface of the optical isolator 15 is provided at the port P2. Further, at the port P3, the collimator lens 22 and the coupling focus lens 23 are provided for connection with the optical fiber 16 optically connected to the output end surface of the excitation light source 14.

Figure 6:
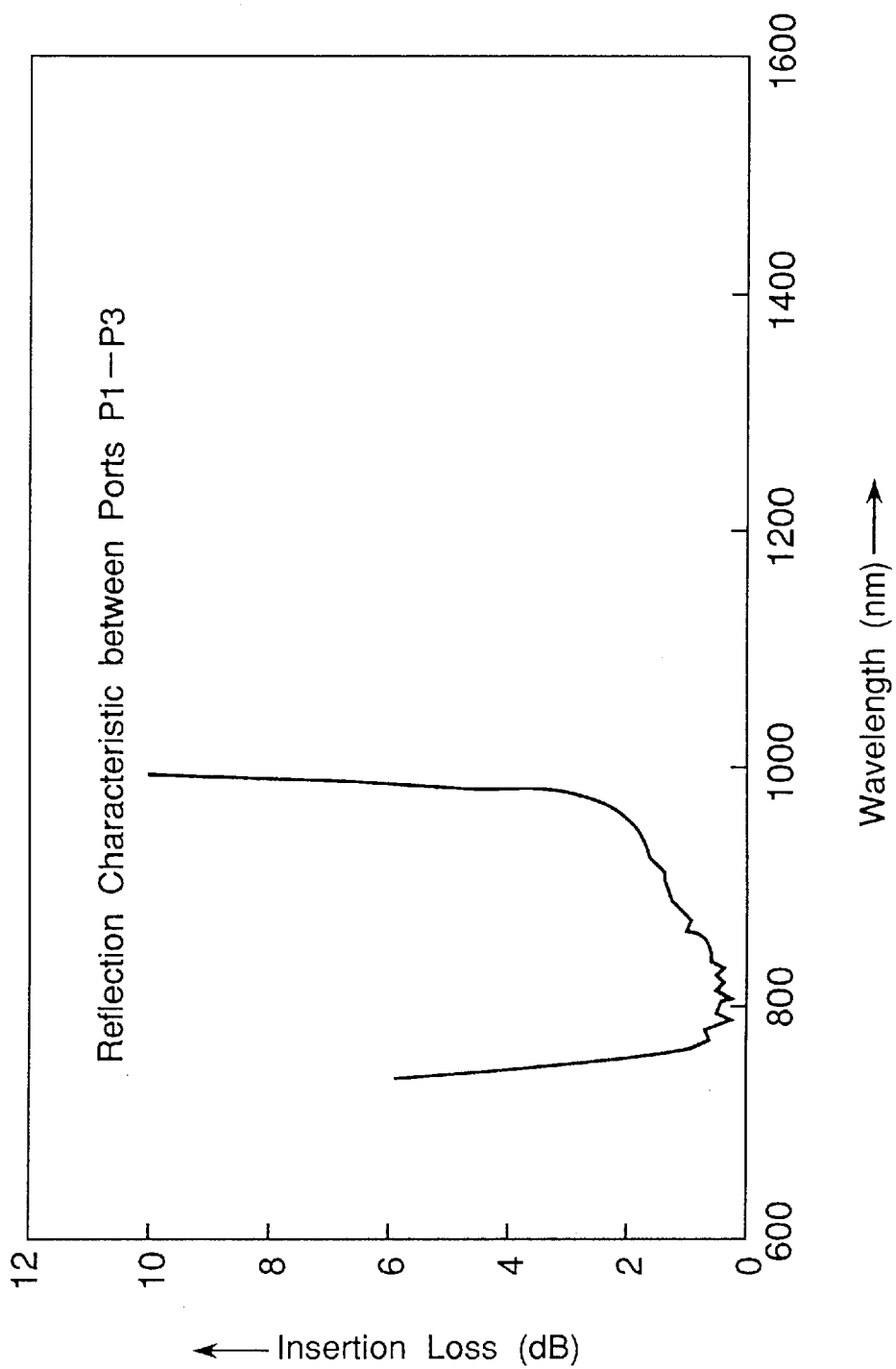
FIG. 6 is a graph showing a wavelength characteristic of a reflection loss between ports P1–P3 in the optical multiplexer module of FIG. 1.

FIG. 6 is a graph showing a wavelength characteristic of insertion loss between ports P1–P3 in the optical multiplexer module 13 of FIG. 1. As is apparently understood from FIG. 6, the optical multiplexer module 13 reflects only the excitation light having wavelengths of 0.80 μm band, and then outputs the reflected excitation light to the port P1.

Figure 7:
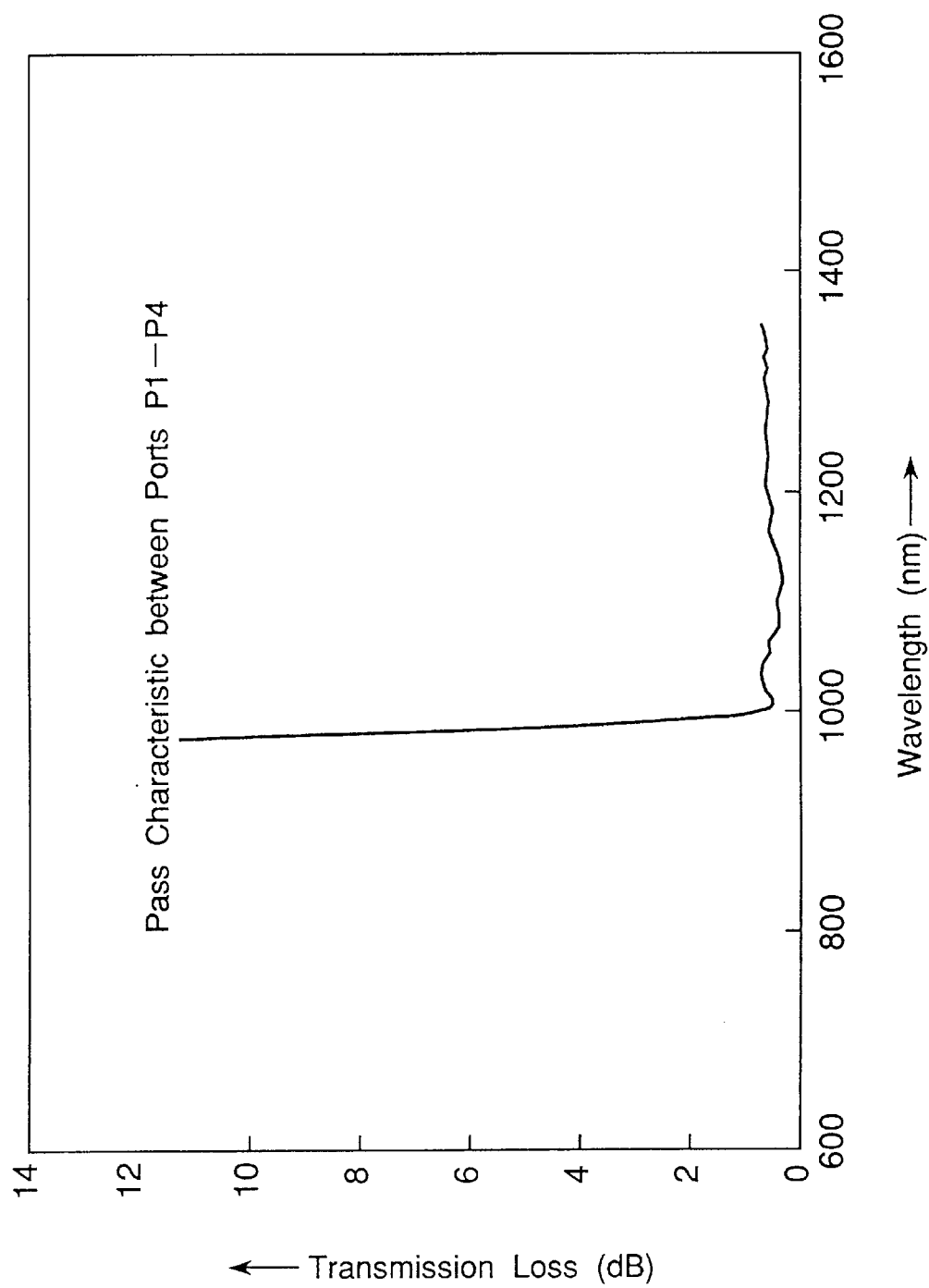
FIG. 7 is a graph showing a wavelength characteristic of a pass loss between ports P1–P4 in the optical multiplexer module of FIG. 1.

FIG. 7 is a graph showing a wavelength characteristic of transmission loss between ports P1–P4 in the optical multiplexer module of FIG. 1. As is apparently understood from FIG. 7, the optical multiplexer module 13 transmits the signal light having the wavelengths more than 1.0 μm incident on the port P1, and then outputs the signal light to the port P4.

The optical fiber 12 transfers in a single mode the signal light output from the optical isolator 11. On the other hand, the excitation light output from the excitation light source 14 is incident onto the multi-layered dielectric plate 25 via the optical fiber 16, the collimator lens 22, and the coupling focus lens 23. The multi-layered dielectric plate 25 reflects the incident excitation light, and outputs the excitation light, which is the resulting reflected light, to the optical fiber 12 via the coupling focus lens 21. By outputting the excitation light to the optical fiber 12, the excitation light is multiplexed or combined with the signal light which has been transferred in the single mode through the optical fiber 12, and then the signal light is amplified through induced emission in the optical fiber 12 by the rare-earth elements contained in the core 31 of the optical fiber 12 and excited by the excitation light. Then, the amplified signal light having wavelengths of 1.06 μm band is transferred toward the optical multiplexer module 13 by the optical fiber 12. This amplified signal light is incident onto the multi-layered dielectric plate 25 at an angle of incidence θ via the coupling focus lens 21, then the multi-layered dielectric plate 25 transmits the signal light as it is, thereby outputting the signal light to the optical isolator 15 via the coupling focus lens 24 and an optical fiber 17. The optical isolator 15 transfers the incident signal light in one direction from the input end thereof to the output end thereof, and then, outputs the signal light as an amplified output light.

In the optical amplifier apparatus 10 having the above-described arrangement, since the optical isolators 11 and 15 are provided at the input thereof end and the output end thereof, respectively, there does not occur any reflected light at the input end and the output end of the optical amplifier apparatus 10, so that the amplified signal light does not return to the input end thereof. Therefore, the optical amplifier apparatus 10 can be prevented from oscillating. This results in that the optical amplifier apparatus 10 can amplify and output the signal light having wavelengths of 1.06 μm band with a relatively large gain.

Furthermore, in the components including (a) the optical fiber 12, which amplifies the signal light due to induced emission, (b) the two optical isolators 11 and 15, and (c) the optical multiplexer module 13, there will be almost no gain variations even if the polarization of the incident signal light changes, so that there is substantially no polarization dependency. Therefore, since the optical amplifier apparatus 10 has almost no gain variations even if the polarization of the incident signal light changes, the optical amplifier apparatus 10 has substantially no polarization dependency. The gain variation of the optical amplifier apparatus 10 due to any variation in the polarization of the signal light can be suppressed, for example, to below 0.2 dB.

Furthermore, as shown in FIG. 1, the optical amplifier apparatus 10 is simpler in construction as compared with the first and second prior art examples. Therefore, it can be reduced in size and weight, as compared with the first and second prior art examples.

EXAMPLES

The present inventor performed experiments with a trial product of the above-described optical amplifier apparatus 10 and obtained the following experimental results. It is noted that the parameters were set as follows unless otherwise predetermined:

(a) Length of optical fiber 12=143 m;
(b) Doping amount of Nd=140 ppm;
(c) Numerical apertures NA of optical fiber 12=0.2;
(d) Wavelength λp of excitation light source 14=0.808 μm;
(e) Excitation light power Pp of excitation light source 14=54 mW;
(f) Difference between refractive indexes of optical fiber 12 as defined by the Equation (3)=1%; and
(g) Addition density of Al=4000 ppm.

Figure 8:
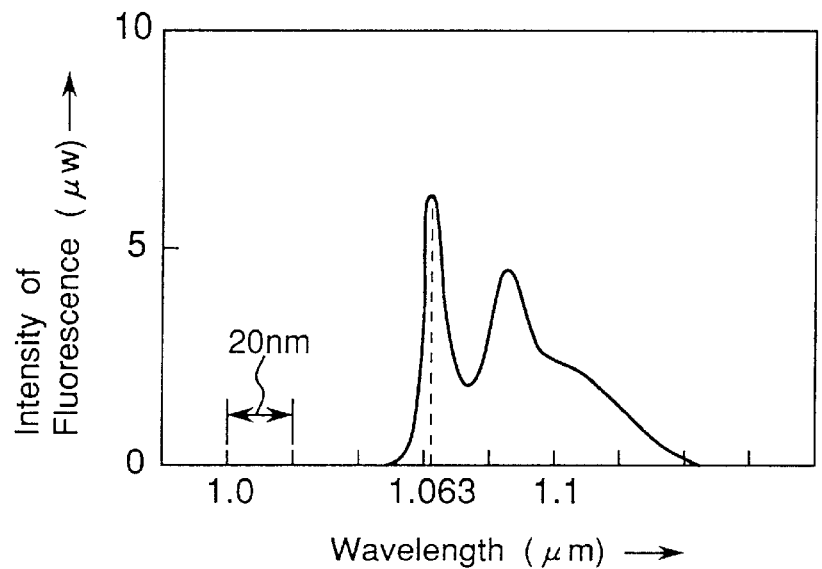
FIG. 8 is a graph showing a wavelength characteristic of an intensity of fluorescence in the optical fiber of FIG. 1.

FIG. 8 is a graph showing a wavelength characteristic of intensity of fluorescence, or fluorescent spectrum, of the optical fiber 12 of FIG. 1. As is apparent from FIG. 8, the peak wavelength of the fluorescent spectrum contributing to the amplification of the signal light outputted from the laser 1 was 1.063 μm, and the 3 dB band width thereof was 15 nm.

Figure 9:
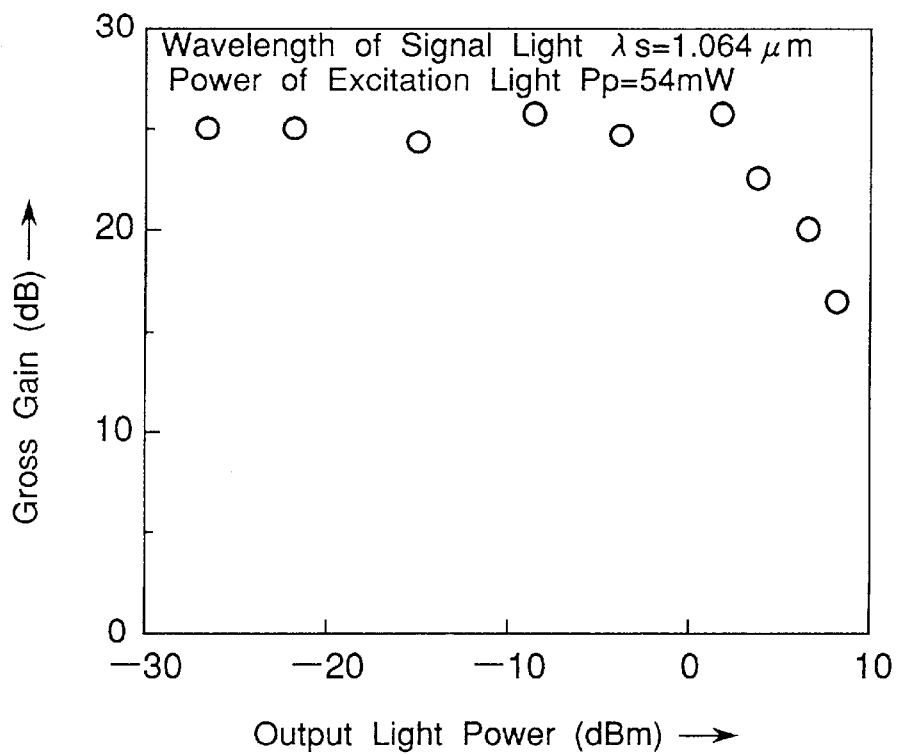
FIG. 9 is a graph showing a characteristic of gross gain relative to an output light power from the optical amplifier apparatus of FIG. 1.

FIG. 9 is a graph showing a characteristic of gross gain relative to output light power in the optical amplifier apparatus 10 of FIG. 1. In this case, the gross gain Gg is defined as the gain for measuring the substantial gain of the optical amplifier apparatus 10 without measuring losses of the coupling portions and the like, and can be expressed by the following Equation (2):

$$Gg=10 \cdot \log\{(Pon-Poff)/Pin\} \text{ (dB)} \qquad (2),$$

where,

Pin is the light power of the signal light incident to the optical fiber 12, Pon is the light power of the signal light outputted from the optical amplifier apparatus 10 with the optical fiber 12 optically connected thereto, and Poff is the light power of the signal light outputted from the optical amplifier apparatus 10 with the optical fiber 12 optically unconnected thereto.

As is apparent from FIG. 9, a gross gain of approximately 25 dB has been obtained with the output light power in the range from −30 dBm to 0 dBm. Further, the saturation output power defined as the output light power with a gain reduction of 3 dB from the saturation gain was 4 dBm.

Figure 10:
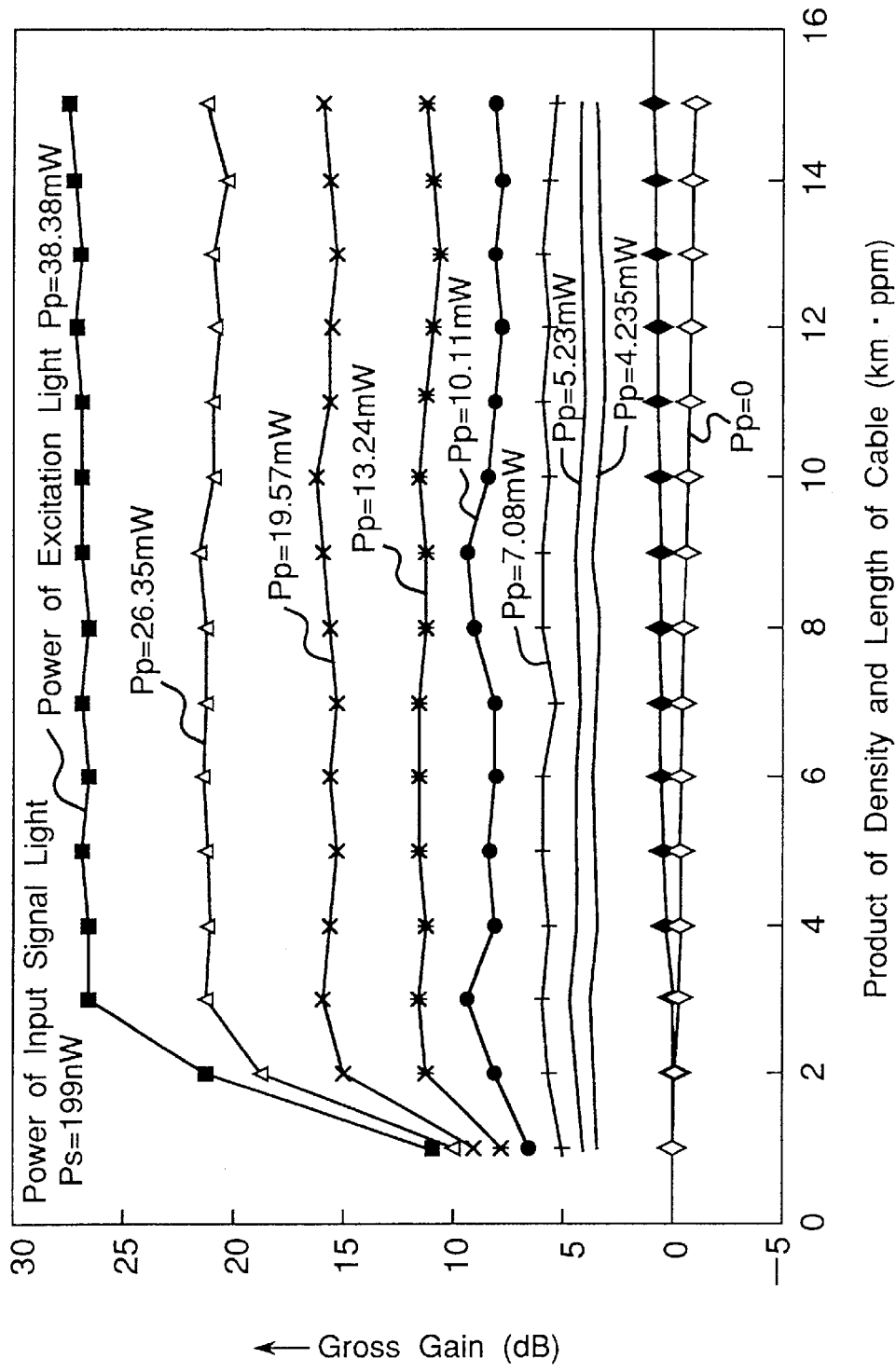
FIG. 10 is a graph showing a characteristic of gross gain relative to a product of density and length of cable of the optical amplifier apparatus of FIG. 1.

FIG. 10 is a graph showing a characteristic of gross gain relative to the product of density and length of cable with the excitation light power Pp=50 mW in the optical amplifier apparatus 10 of FIG. 1. In this case, the product of density and length of cable is defined as a product of the doping amount or doping density (ppm) of Nd and the length (km) of the optical fiber 12. As is apparent from FIG. 10, the product of density and length of cable is preferably set within a range from 2 km•ppm to 15 km•ppm, and is more preferably set within a range from 3 km•ppm to 15 km•ppm.

Figure 11:
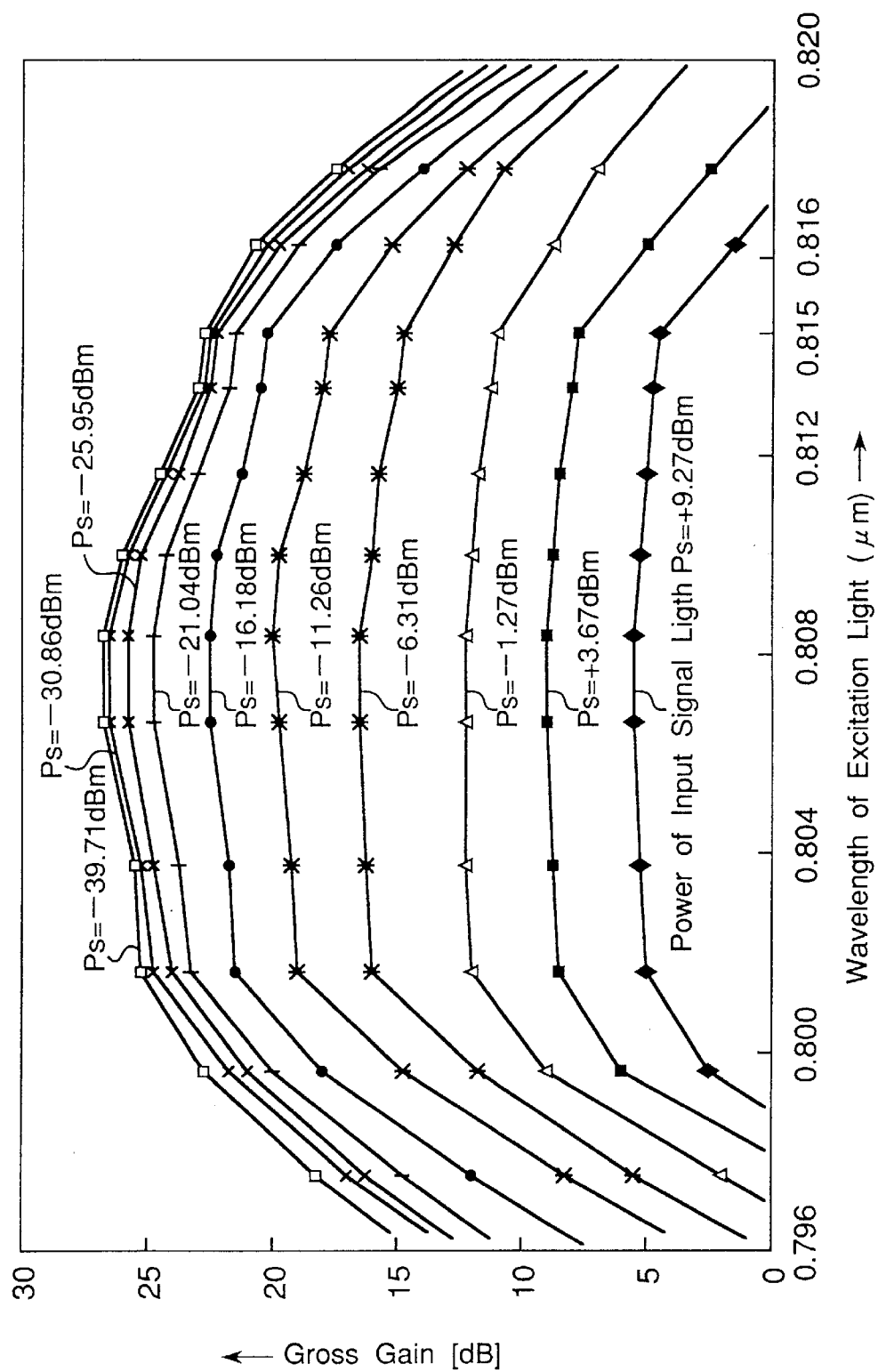
FIG. 11 is a graph showing a characteristic of gross gain relative to the wavelength of excitation light in the optical amplifier apparatus of FIG. 1.

FIG. 11 is a graph showing a characteristic of gross gain relative to the wavelength of excitation light in the optical amplifier apparatus 10 of FIG. 1. As is apparent from FIG. 11, the wavelength of excitation light is set preferably within a range from 0.8068 μm to 0.8082 μm.

Figure 12:
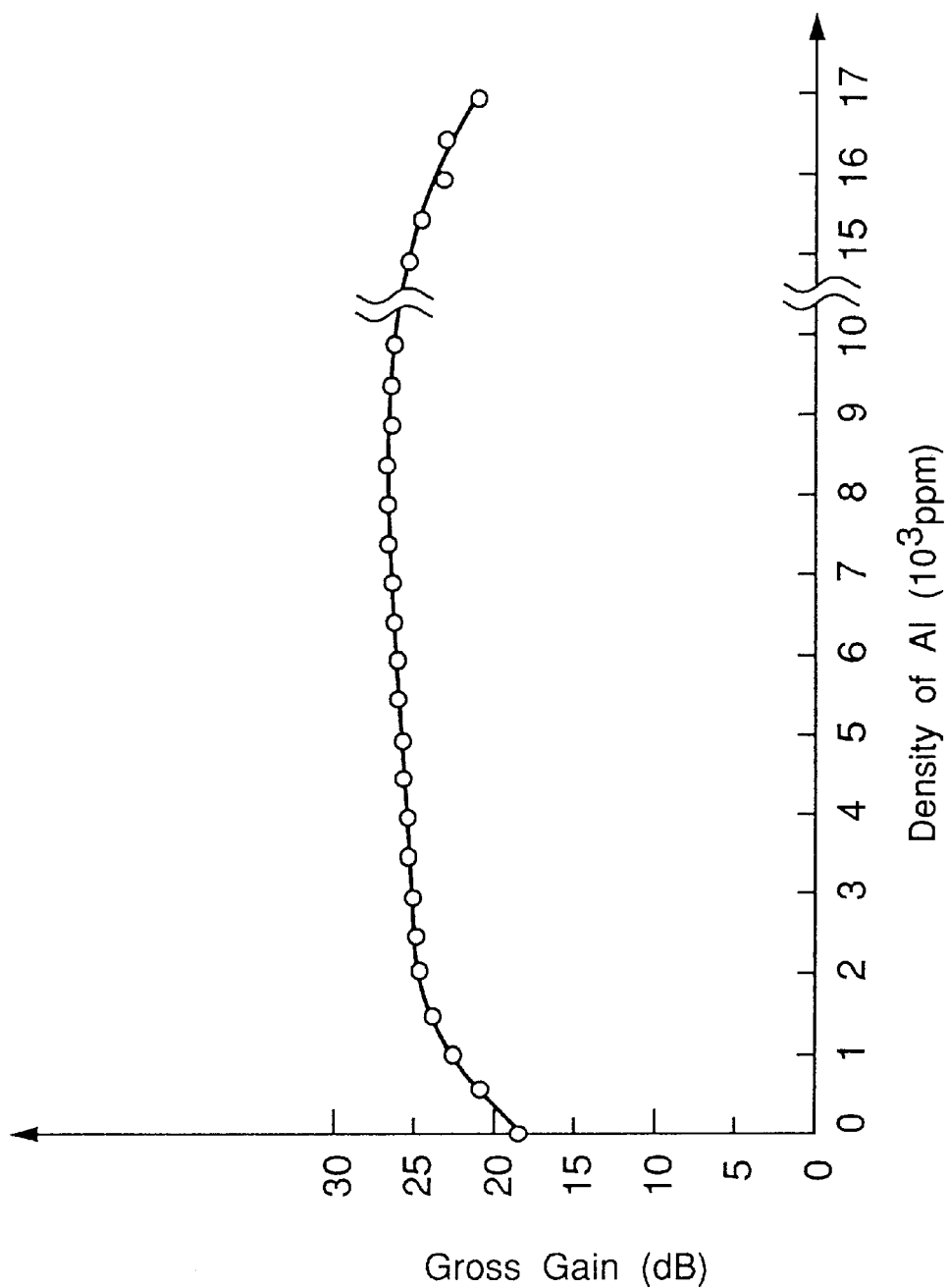
FIG. 12 is a graph showing a characteristic of gross gain relative to an addition density of Al in the optical amplifier apparatus of FIG. 1.

FIG. 12 is a graph showing a characteristic of gross gain relative to the density of Al added into the optical fiber 12 in the optical amplifier apparatus 10 of FIG. 1. As is apparent from FIG. 12, the addition density of Al is preferably set within a range from 500 ppm to 15,000 ppm, and more preferably set within a range from 1,500 ppm to 10,000 ppm. The addition of Al allows the doping density of Nd to be increased, for example, tenfold or more, as compared with that when no Al is added.

Figure 13:
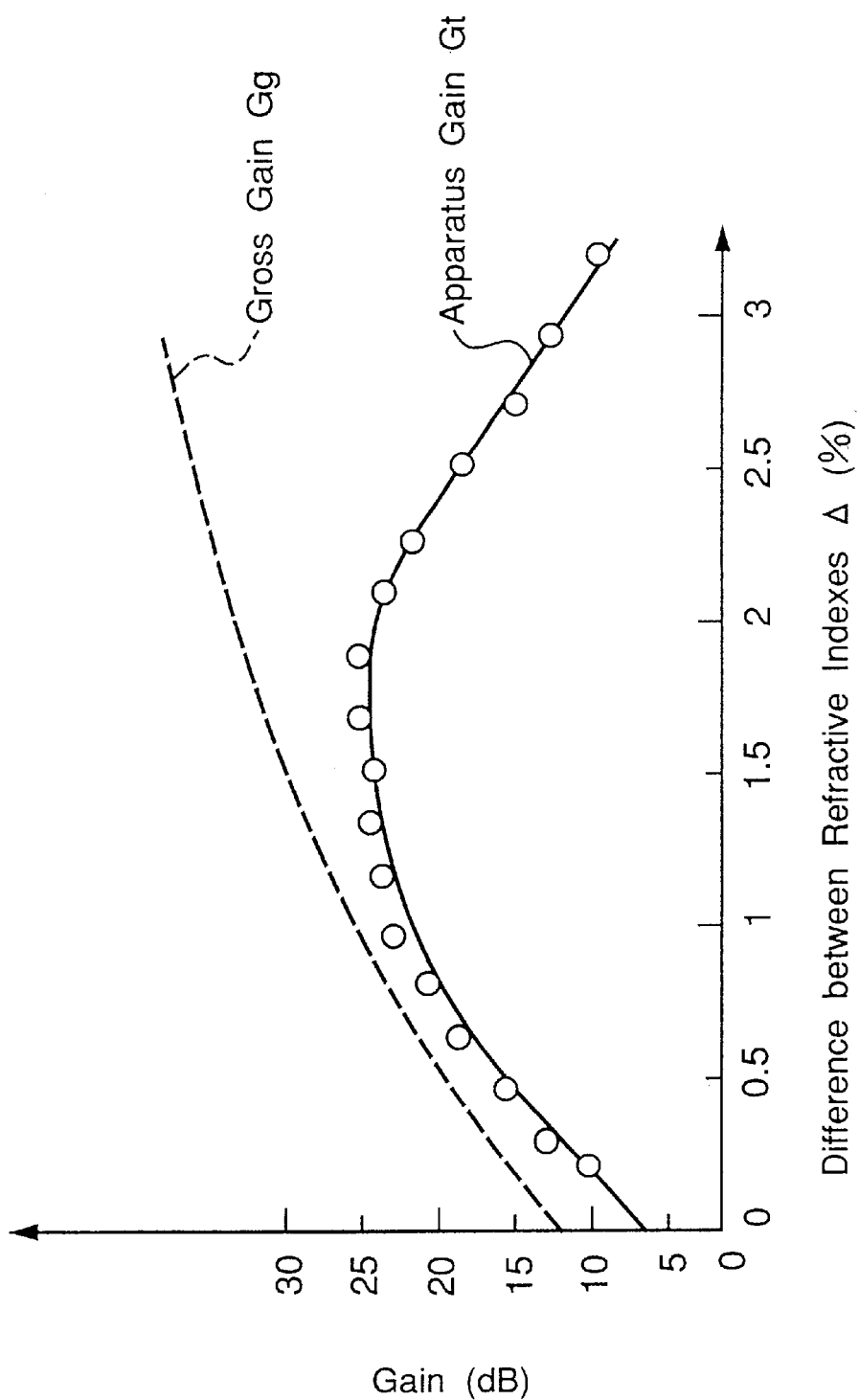
FIG. 13 is a graph showing characteristics of gross gain and apparatus gain relative to the difference between refractive indexes in the optical amplifier apparatus of FIG. 1.

FIG. 13 is a graph showing characteristics of gross gain Gg and apparatus gain Gt relative to the difference Δ between refractive indexes in the optical amplifier apparatus 10 of FIG. 1. In this case, the difference Δ between refractive indexes is defined as a difference Δ in refractive index between the core 31 and the cladding 32 of the optical fiber 12, and can be defined by the following Equation (3):

$$\Delta=(n_1^2-n_2^2)/(2n_1^2)\times 100 \text{ (\%)} \qquad (3),$$

where $n_1$ is the refractive index of the core 31, and $n_2$ is the refractive index of the cladding 32.

Furthermore, the apparatus gain Gt is the gain of the whole apparatus, and can be defined by the following Equation (4):

$$Gt=Gg-Lt \text{ (dB)} \qquad (4),$$

where Lt is the loss containing pass losses of the optical isolators 11 and 15, connection losses of their input and output connecting portions, a pass loss of the optical multiplexer module 13, connection losses of its input and output connecting portions, and the like.

As is apparent from FIG. 13, the gross gain Gg monotonously increases with increasing difference Δ between refractive indexes, whereas the apparatus gain Gt of the whole apparatus has a peak (maximum) value existing. This could be attributed to the fact that increasing the difference Δ between refractive indexes causes the propagation cross sectional area (mode field diameter) in the optical fiber 12 to reduce, so that the connection loss with the optical isolator 11 increases. Furthermore, the difference Δ between refractive indexes is preferably set within a range from 0.8% to 2%, and is more preferably set within a range from 1.4% to 1.8%.

Figure 14:
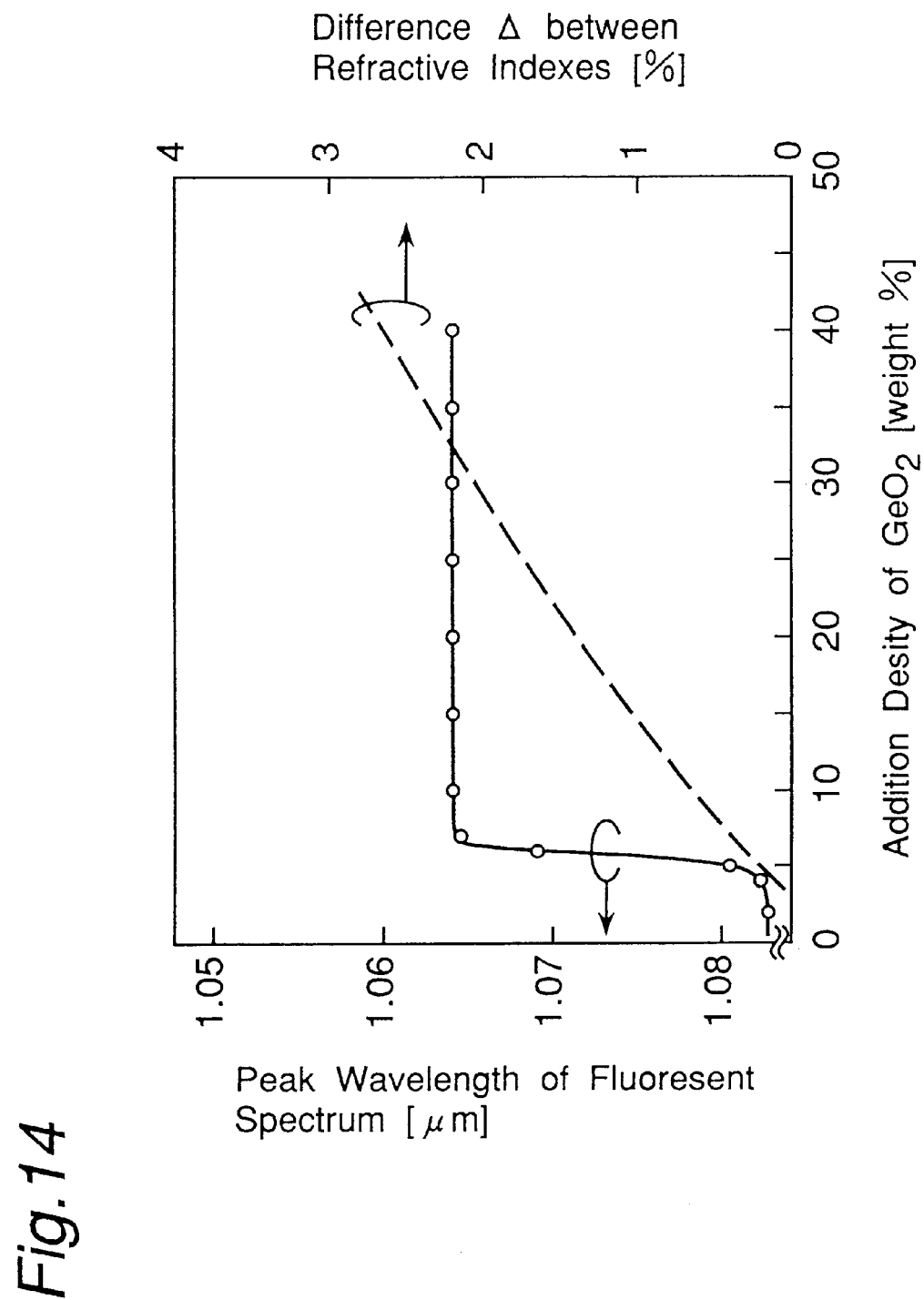
FIG. 14 is a graph showing characteristics of peak wavelength of fluorescent spectrum and difference between refractive indexes relative to the addition density of $GeO_2$ in the optical amplifier apparatus of FIG. 1.

FIG. 14 is a graph showing characteristics of peak wavelength of fluorescent spectrum and difference between refractive indexes relative to the addition density of $GeO_2$ in the optical amplifier apparatus of FIG. 1.

As is apparent from FIG. 14, Ge is added, namely, $GeO_2$ is actually added to the optical fiber 12, then the peak wavelength of fluorescent spectrum is shifted toward shorter wavelengths, or the wavelength of signal light (1.06 μm). The shift effect of peak wavelength due to the addition of Ge is saturated when the addition density of $GeO_2$ is approximately 5 weight %, which is the lower limit value of the addition density of $GeO_2$. Adding Ge to the core 31 causes the difference between refractive indexes to increase simultaneously, where the upper limit value of the addition density of $GeO_2$ is approximately 35 weight % because the upper limit of the set range of the optimum difference between refractive indexes is approximately 2% as is apparent from FIG. 13. Accordingly, the addition density of $GeO_2$ doped to the core 31 is set preferably within a range from 5 weight % to 35 weight %.

Other Preferred Embodiments

Figure 3:
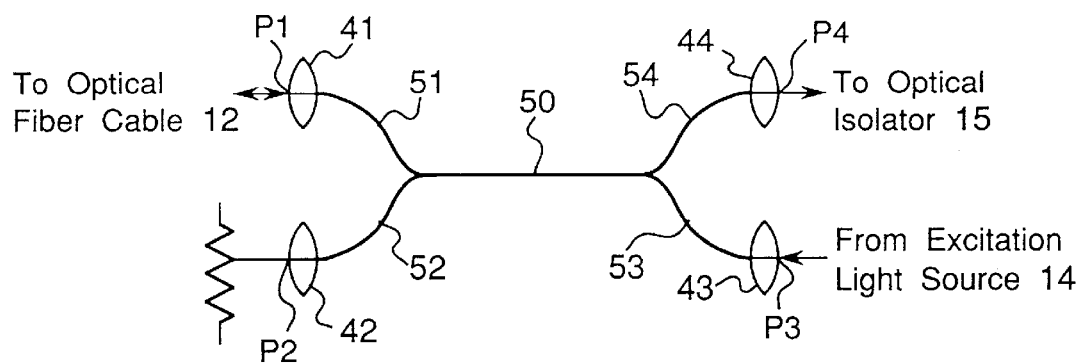
FIG. 3 is a block diagram showing an optical multiplexer module of a modification example.

In the above-described preferred embodiments, the optical multiplexer module 13 of FIG. 1 is used. However, the present invention is not limited to this, and an optical multiplexer module 13 using an optical fiber coupler as shown in FIG. 3 may be used. As shown in FIG. 3, one end of an optical fiber 50 is branched into two directions so that one end of the optical fiber 50 is optically connected to two optical fibers 51 and 52, while another end of the optical fiber 50 is branched into two directions so that another end of the optical fiber 50 is optically connected to two optical fibers 53 and 54. One end of the optical fiber 51 is optically connected to the optical fiber 12 via a coupling focus lens 41 provided at a port P1, while one end of the optical fiber 52 is optically connected to an optical terminator via a coupling focus lens 42 provided at a port P2. Further, one end of the optical fiber 53 is optically connected to the excitation light source 14 via a coupling focus lens 43 provided at a port P3 and the optical fiber, while one end of the optical fiber 54 is optically connected to an optical isolator 15 via a coupling focus lens 44 provided at a port P4. The optical multiplexer module of a modification example, having the above-mentioned arrangement operates in the same manner as that of the optical multiplexer module of FIG. 1.

In the above-mentioned preferred embodiments, the Nd:YAG laser 1 is used. However, the present invention is not limited to this, a semiconductor laser or a fiber laser may be used. The fiber laser here mentioned is one which has light-reflecting means provided at each of both ends of an optical fiber, and which, when the excitation light is incident into the optical fiber, repeatedly reflects and resonates between both ends of the optical fiber, induced emission light generated by the excitation light within the optical fiber, and then extracts and outputs light resulting therefrom.

In the above-mentioned embodiments, fluorine may be added to the cladding 32. The difference between refractive indexes can be changed by the addition of fluorine.

In the above-mentioned embodiments, optical amplifier apparatuses of the rear excitation system has been described with reference to FIG. 1. However, the present invention is not limited to this, but may be applied to optical amplifier apparatuses of a front excitation system. In the optical amplifier apparatus of the front excitation system, the optical multiplexer module 13, which is a light-multiplexing means, is provided between the isolator 11 and one end of the optical fiber 12, wherein the signal light and the excitation light are incident to the optical multiplexer module 13 so as to be multiplexed or combined with each other, and these two beams of light are incident into the optical fiber 12 in the same direction. The functions and effects of the following steps to above are similar to those of the optical amplifier apparatus of the rear excitation system described before.

As described in detail hereinabove, according to the preferred embodiments of the present invention, a signal light having wavelengths of 1.06 $\mu$m band can be amplified without causing the gain to change due to any polarization variation of the signal light. Further, the optical amplifier apparatus of the present invention is advantageously small in size and light in weight as compared with the prior art examples.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical amplifier apparatus comprising:
first optical isolator means for making an incident signal light having wavelengths within the 1.06 $\mu$m band pass therethrough in one direction from an input end thereof to an output end thereof, and outputting the signal light;
an optical fiber including a core mainly composed of silica glass and doped with Nd and Al, and a cladding of silica glass, said optical fiber transferring in a single mode the signal light output from said first optical isolator means;
excitation light source means for generating excitation light having an excitation wavelength of 0.8 $\mu$m band;
optical multiplexer means for multiplexing the excitation light generated by said excitation light source with signal light transferred by said optical fiber, by outputting the excitation light generated by said excitation light source to said optical fiber, and for transferring and outputting the signal light having wavelengths of 1.06 $\mu$m band amplified by induced emission in said optical fiber due to the Nd excited by the excitation light; and
second optical isolator means for making the signal light output from said optical multiplexer means pass therethrough in one direction from an input end thereof to an output end thereof, and outputting the signal light as amplified signal light, wherein said core of said optical fiber is sufficiently doped with Al to thereby provide an increased available doping density of Nd, resulting in increased amplification of the signal light.

2. The optical amplifier apparatus as claimed in claim 1, wherein the excitation wavelength is set within a range from 0.800 $\mu$m to 0.815 $\mu$m.

3. The optical amplifier apparatus as claimed in claim 1, wherein a density of Al is set within a range from 500 ppm to 15,000 ppm.

4. The optical amplifier apparatus a claimed in claim 2, wherein a density of Al is set within a range from 500 ppm to 15,000 ppm.

5. The optical amplifier apparatus as claimed in claim 3, wherein said core is further doped with Ge, thereby shifting a fluorescent spectrum generated by said core and said excitation light towards 1.06 $\mu$m.

6. The optical amplifier apparatus as claimed in claim 4, wherein said core is further doped with Ge, thereby shifting a fluorescent spectrum generated by said core and said excitation light towards 1.06 $\mu$m.

7. The optical amplifier apparatus as claimed in claim 3, wherein a product of a doping amount of Nd into the optical fiber and a length of said optical fiber is set within a range from 2 km•ppm to 15 km•ppm.

8. The optical amplifier apparatus as claimed in claim 4, wherein a product of a doping amount of Nd into the optical fiber and a length of said optical fiber is set within a range from 2 km•ppm to 15 km•ppm.

9. The optical amplifier apparatus as claimed in claim 5, wherein a product of a doping amount of Nd into the optical fiber and a length of said optical fiber is set within a range from 2 km•ppm to 15 km•ppm.

10. The optical amplifier apparatus as claimed in claim 6, wherein a product of a doping amount of Nd into the optical fiber and a length of said optical fiber is set within a range from 2 km•ppm to 15 km•ppm.

11. An optical amplifier apparatus comprising:
first optical isolator means for making an incident signal light having wavelengths within the 1.06 $\mu$m band pass therethrough in one direction from an input end thereof to an output end thereof, and outputting the signal light;
an optical fiber including a core composed of silica glass and doped with a predetermined rare-earth element and other elements, and a cladding of silica glass, said optical fiber transferring in a single mode the signal light output from said first optical isolator means;
excitation light source means for generating excitation light having an excitation wavelength of 0.8 $\mu$m band;
optical multiplexer means for multiplexing the excitation light generated by said excitation light source with a signal light transferred by said optical fiber, by outputting the excitation light generated by said excitation light source to said optical fiber, and for transferring and outputting the signal light having wavelengths of 1.06 $\mu$m band amplified by induced emission in said optical fiber due to the rare-earth element excited by the excitation light; and second optical isolator means for making the signal light output from said optical multiplexer means pass therethrough in one direction from an input end thereof to an output end thereof, and outputting the signal light as an amplified signal light, wherein a difference between refractive indexes of said core and said cladding of said optical fiber is set between a minimal difference which minimizes gross gain and a maximal difference which maximizes gross gain, thereby maximizing apparatus gain.

12. The optical amplifier apparatus as claimed in claim 11, wherein said difference is set within a range from 0.8% to 2%.

13. The optical amplifier apparatus as claimed in claim 2, wherein a difference between refractive indexes of the core and the cladding of said optical fiber is set within a range from 0.8% to 2%.

14. The optical amplifier apparatus as claimed in claim 3, wherein a difference between refractive indexes of the core and the cladding of said optical fiber is set within a range from 0.8% to 2%.

15. The optical amplifier apparatus as claimed in claim 5, wherein a difference between refractive indexes of the core and the cladding of said optical fiber is set within a range from 0.8% to 2%.

16. The optical amplifier apparatus as claimed in claim 7, wherein a difference between refractive indexes of the core and the cladding of said optical fiber is set within a range from 0.8% to 2%.

17. The optical amplifier apparatus as claimed in claim 5, wherein an addition density of $GeO_2$ with which said core is doped is set within a range from 5 weight % to 35 weight %.

18. The optical amplifier apparatus as claimed in claim 6, wherein an addition density of $GeO_2$ with which said core is doped is set within a range from 5 weight % to 35 weight %.

19. The optical amplifier apparatus as claimed in claim 1, wherein a difference between refractive indexes of said core and said cladding of said optical fiber is set between a minimal difference which minimizes gross gain and a maximal difference which maximizes gross gain, thereby maximizing apparatus gain.

20. The optical amplifier apparatus as claimed in claim 19, wherein said difference is set within a range from 0.8% to 2%.

21. A method of amplifying signal light comprising the steps of:

passing incident signal light having wavelengths within the 1.06 $\mu$m band in one direction from an input end to an output end of a first optical isolator;

transferring in a single mode the signal light output from said first optical isolator via an optical fiber including a core composed of silica glass and doped with Nd and Al, and a cladding of silica glass;

generating excitation light having an excitation wavelength of 0.8 $\mu$m band;

outputting the excitation light generated by said excitation light source to said optical fiber;

amplifying the signal light having wavelengths of 1.06 $\mu$m band by induced emission in said optical fiber due to the Nd excited by the excitation light;

passing the signal light output from said amplifying step in one direction from an input end to an output end of a second signal isolator, and outputting the signal light as amplified signal light; and sufficiently doping, prior to said transferring step, said core of said optical fiber with Al to thereby provide an increased available doping density of Nd, resulting in increased amplification in the amplifying step.

* * * * *